United States Patent [19]

Wuyts

[11] Patent Number: 5,751,847
[45] Date of Patent: May 12, 1998

[54] METHOD AND APPARATUS FOR DETERMINING THE COLOR OR COLOR CODE OF AN OBJECT

[75] Inventor: Robert Wuyts, Antwerpen, Belgium

[73] Assignee: Framatome Connectors International, Courbevoie, France

[21] Appl. No.: 635,893

[22] PCT Filed: Oct. 31, 1994

[86] PCT No.: PCT/EP94/03597

§ 371 Date: Sep. 10, 1996

§ 102(e) Date: Sep. 10, 1996

[87] PCT Pub. No.: WO95/12806

PCT Pub. Date: May 11, 1995

[30] Foreign Application Priority Data

Nov. 5, 1993 [NL] Netherlands ............... 9301915
Sep. 15, 1994 [NL] Netherlands ............... 9401496

[51] Int. Cl.[6] .................................................. G06K 9/00
[52] U.S. Cl. .................................. 382/165; 364/526
[58] Field of Search .............................. 382/162, 165, 382/191; 358/520; 348/91; 364/526

[56] References Cited

U.S. PATENT DOCUMENTS 4,731,663 3/1988 Kovalchick et al. ........... 358/101
4,797,738 1/1989 Kashi et al. ................... 382/165
4,991,223 2/1991 Bradley ......................... 382/17
5,206,918 4/1993 Levene .......................... 382/17
5,317,648 5/1994 Sawada et al. ................. 382/162

FOREIGN PATENT DOCUMENTS

3440711 A1 5/1985 Germany.

*Primary Examiner*—Leo Boudreau
*Assistant Examiner*—Phuoc Tran
*Attorney, Agent, or Firm*—Perman & Green, LLP

[57] ABSTRACT

A method for determining the color or color code of an object uses for example a color camera for making a color picture of the object. For a plurality of pixels of the color picture of the object distributed over the surface of the object, the S-, H- and B-values of the color picture are determined and the color is determined by comparison of these S-, H- and B-values with predetermined reference values. The B-value of each pixel is compared with a first reference value determining whether a pixel is black or not, whereafter, if the pixel is not black, the S-value of each pixel is then compared with a second reference value determining whether a pixel is colorless or not, whereafter, if the pixel is not colorless, the color of each pixel is determined by means of the H-value.

8 Claims, 3 Drawing Sheets

METHOD AND APPARATUS FOR DETERMINING THE COLOR OR COLOR CODE OF AN OBJECT

The invention relates to a method and apparatus for determining the colour or colour code of an object, like for example an electrical insulated wire or an electrical component and more particularly to a method and apparatus according to the preamble of claims 1 and 7, respectively, and to applications of the method according to claims 5 and 6.

U.S. Pat. No. 4,731,663 discloses a method and apparatus according to the preamble of claims 1 and 7, respectively. In this known method the objects are first placed proximate to a white background. Further the known method requires a teach-in cycle to obtain a set of reference values. Optical filters or a stripe filter are used to pass red, green and blue spectral components of the light, respectively.

U.S. Pat. No. 4,991,223 discloses a method and apparatus for recognizing image features using colour elements. Eight predetermined colour ranges are used to detect the edges of an object. The colour of the object is not determined.

U.S. Pat. No. 5,206,918 discloses a method for colour analysis wherein three primary colour measurements are transformed into saturation, hue and brightness values. In the embodiment described in this document the method is used to rate the quality of a baked product wherein the red-green information is compared with a predetermined range.

The present invention aims to provide a method and apparatus of the above-mentioned type, which can determine the colour or colour code of an object quickly and with high accuracy.

To this end the method of the invention shows the characterizing features of claim 1 and the apparatus shows the features of claim 7.

In this manner a method and apparatus are obtained by means of which the colour or colour code of an object can be determined quickly in a very reliable manner.

The invention will be further explained by reference to the drawings in which an example for the application of the method according to the invention is very schematically shown.

Figure 1:
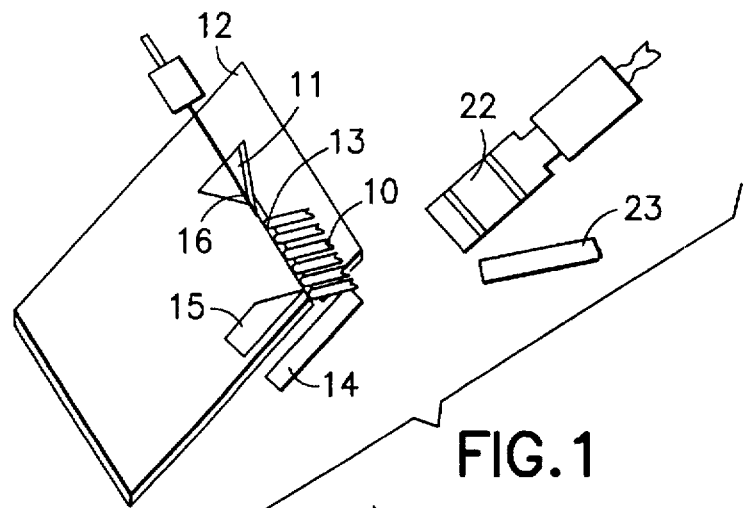
FIG. 1 shows a very schematical perspective view of some important components of an application of the method according to the invention in an apparatus for wiring a connector.
Figure 2:
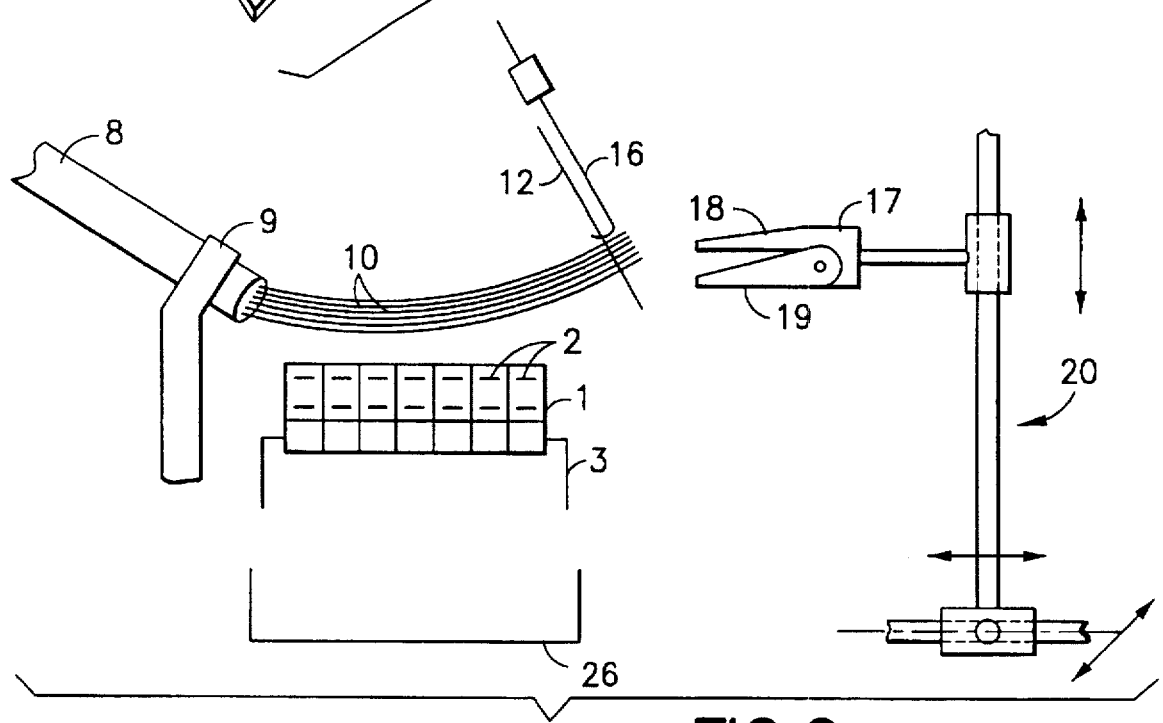
FIG. 2 shows very schematically a side view of the apparatus of FIG. 1.
Figure 3:
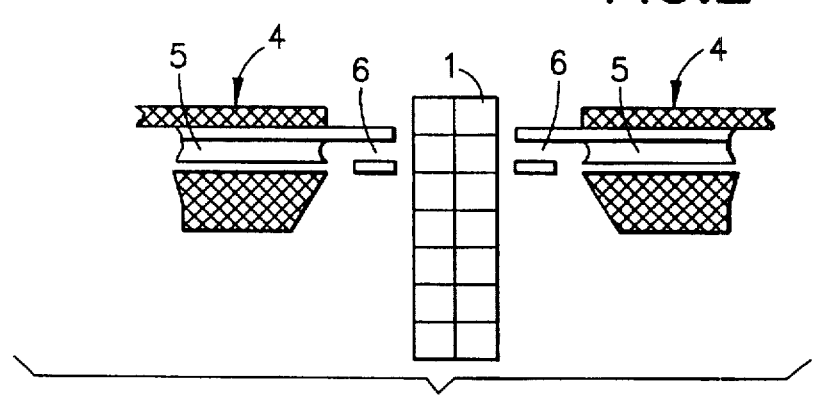
FIG. 3 shows very schematically a top view of a part of the apparatus of FIG. 1.

Referring to FIGS. 1–4 there is shown very schematically an apparatus for wiring a connector 1 with a plurality of contacts 2 of the IDC-type. In this apparatus the method according to the invention is used for determining the colour code of the wires which should be connected to the contacts. However, the method according to the invention is not restricted to such an application and is generally suitable for determining the colour of an object.

The apparatus comprises a holder 3 in which the connector 1 to be wired is placed, wherein a wire insertion head 4 is located at each side of the holder 3, said wire insertion head having a tool 5 movable back and forth transverse to the longitudinal direction of the holder 3. Each wire insertion head 4 further comprises a wire guiding means 6 into which a wire to be connected to a contact 2, can be brought. The wire insertion heads 4 are movable in the longitudinal direction of the holder 3 by a driving means 7 indicated in the block diagram of FIG. 4, so that the tools 5 can be aligned with each contact 2 of the connector 1 located in the holder 3.

The apparatus further comprises wire selection means which are mounted in a predetermined fixed position. The wires are generally part of a cable 8 which is clamped in a cable clamp 9 schematically shown. The wires 10 are inserted into an insertion opening 11 of a stationary located wire selection plate 12 which is part of the wire selection means. A selection slot 13 is provided in the wire selection plate 12, said slot 13 joining the insertion opening 11 at one side and at the other side debouching with an outlet in an edge of the wire selection plate 12 lying below the insertion opening 11. The wires 10 inserted into the insertion opening 11 fall in a random order into the selection slot 13, the width of which corresponds with the diameter of the individual wires 10. The outlet of the selection slot 13 is closed by a shutter 14 which is operable in a manner not further shown for opening the outlet of the wire selection slot 13. Further, the wire selection means comprises a slide 15 with a wedge-shaped end, said slide being movable transverse to the selection slot 13 in a manner also not further shown. The wires 10 which fall into the selection slot 13 under influence of the gravity, are pressed downwards by a pressing member 16.

The apparatus is further provided with a gripper 17 with a fixed upper jaw part 18 and a movable lower jaw part 19. The gripper 17 is movable by schematically shown means 20 for moving the gripper in the x-, y- and z-directions.

Figure 4:
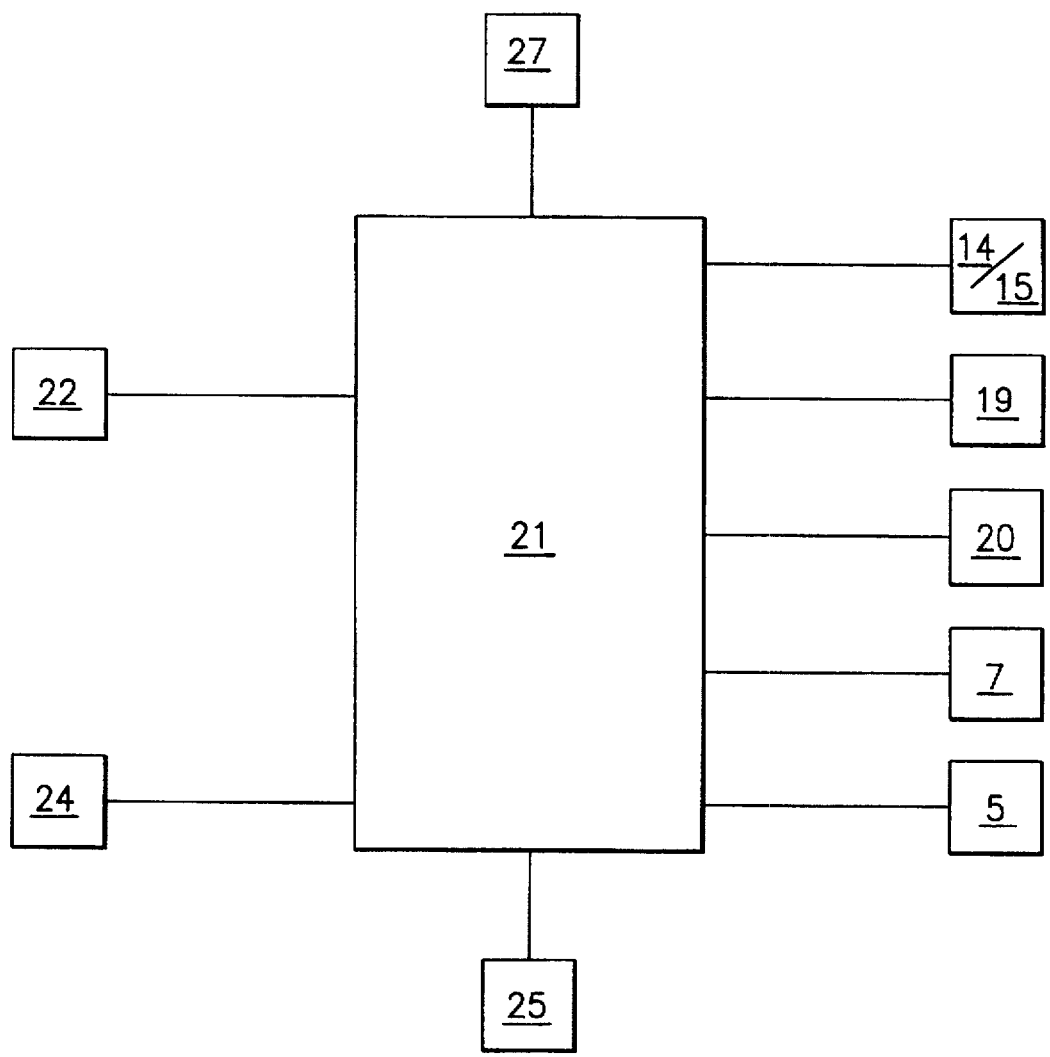
FIG. 4 is a block diagram of the apparatus of FIG. 1.

Finally, the apparatus comprises a processing unit 21 schematically indicated in FIG. 4, said processing unit 21 being provided with high speed microprocessors. A colour camera 22 is connected to the processing unit 21, which camera 22 provides colour signals by means of which the processing unit can identify an observed wire. A light source 23 illuminates the wire adjacent the shutter 14, so that the colour camera 22 can observe a constantly illuminated picture. Wiring diagrams for various connectors can be stored in a memory 24, wherein, through a keyboard 25, the processing unit 21 can be set for wiring a certain connector and the processing unit will control the wiring process by means of the wiring diagram stored in the memory 24.

For wiring a connector 1, the connector is placed in the holder 3 and the wires 10 of the cable 8 are put through the insertion opening 11 of the wire selection plate 12. The wires 10 fall into the slot 13 wherein the lowermost wire will be lying on the shutter 14. Subsequently, the processing unit 21 actuates the slide 15 operating as a separator so that the wire 10 adjacent the shutter 14 will be separated from the remaining wires 10. The separated wire 10 is illuminated by the light source 23 and the colour camera 22 supplies picture signals to the processing unit 21. The processing unit 21 controls the gripper moving means 20 and the movable jaw part 19 of the gripper 17 in such a manner that the separated wire is gripped and is held in a predetermined position, so that an unambiguous observation of each separated wire is possible.

The processing unit 21 determines the colour code of the observed wire 10 from the received picture signals of the colour camera 22. Normally, this colour code consists of a main colour wherein a second colour can be present or not in rings with a predetermined repetition frequency. It will be assumed hereinafter that this second colour is black. However, other colours are possible as second colour.

When the processing unit 21 has determined the colour code of the separated wire 10, the shutter 14 is opened, so that the separated wire is released. The remaining wires are held in the selection slot 13 by the slide 15. The processing unit 21 controls the gripper moving means 20 in such a manner that the gripper 17 moves the wire 10 towards the wire guiding means 6 lying at the side where the contact 2 to be wired of the connector 1 is located. Further, the processing unit 21 controls the driving means 7 of the wire insertion heads 4 in such a manner that the tools 5 are aligned with the contact 2 to be wired. The gripper 17 moves according to a spherical shell path, the centre of which is located substantially in the cable clamp 9. As soon as the wire 10 is in the respective wire guiding means 6, the gripper 17 moves according to a second spherical shell path with smaller radius and tightens the wire 10 in the wire guiding means 6. Thereafter, the processing unit 21 actuates the respective tool 5 and the wire 10 is cut in a usual manner at the correct length and is attached to the respective contact 2. The cut-off wire part is disposed in a scrap container 26 by the gripper 17.

Simultaneously with moving the released wire 10 to the wire guiding means 6, the processing unit 21 controls the shutter 14 for closing the selection slot 13 and the slide 15 is controlled for opening the selection slot 13. The wires 10 move downwardly in the selection slot 13, whereafter the slide 15 separates the remaining wires 10 again from the wire 10 adjacent the shutter 14. After the earlier released wire has been attached in the corresponding contact 2, a next wire can be identified and can be attached to the corresponding contact.

The processing unit 21 stores the already connected wires 10 of a connector 1 to be wired in the memory 24. During the wiring process the processing unit 21 can thereby compare each next separated wire 10 with the wires already connected to contacts 2. If a wire is identified which according to the information stored in the memory 24, is already connected to a contact 2, the processing unit makes a new identification at another location of the wire. When the processing unit 21 finds a colour code during a renewed identification which is contrary to the first identification, for example blue instead of red, the processing unit 21 provides an alarm signal and stops the wiring process of the connector 1. If after a predetermined plurality of identification attempts, for example five, no colour code of a wire 10 not yet connected is found, an alarm signal is also provided and the wiring process of the connector 1 is stopped.

The processing unit 21 shows the selected wiring diagram on a display 27, wherein during wiring also the progress of the wiring process and the obtained result can be shown.

The identification of the colour code by the processing unit 21 preferably takes place as follows:

The picture information obtained from the colour camera 22, is stored in the memory 24 by the processing unit 21. In a plurality of pixels distributed along the length of the observed wire, for example 15 pixels along a length of 7 mm, the hue, saturation and brightness values (H-, S- en B-values) are determined. To this end the processing unit 21 can be equipped with an integrated circuit which is known per se. The saturation value S provides an indication for the white portion. The more white light is mixed with the colour, the smaller the saturation value becomes. The brightness value B provides an indication for the light intensity, wherein a brightness value of zero corresponds with pure black. The hue value H corresponds with the position in the colour circle and is for example expressed in degrees.

Figure 5:
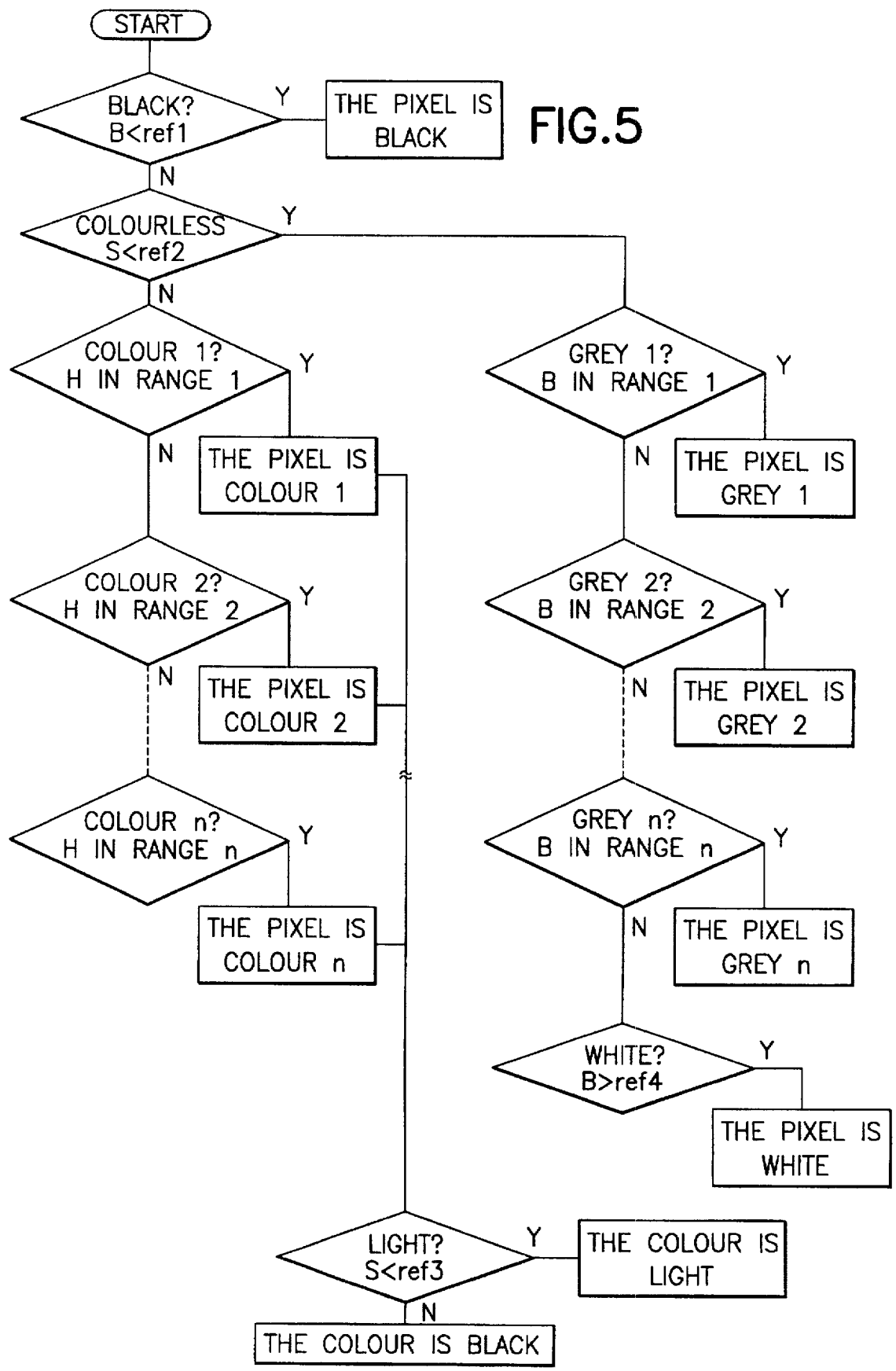
FIG. 5 shows a flow diagram for explanation of the method according to the invention.

As indicated in the flow diagram of FIG. 5, the brightness value is compared with a first reference value in a first step, wherein, if the brightness value B is smaller than the first reference value, it is assumed that the pixel is black. In a second step which of course is only made if the pixel is not black, the saturation value S is compared with a second reference value, wherein, if the value S is smaller than the second reference value, it is assumed that the pixel is colourless or grey or white. If the comparison of the saturation value S with the second reference value indicates that there is indeed a grey or colourless wire, the brightness B is successively compared with successive reference ranges to determine the grey level of the pixel or whether the pixel is white, as indicated in the flow diagram.

If the comparison of the saturation value S with the second reference value indicates that the pixel is not colourless, the hue value H is compared with a plurality of successive reference ranges each corresponding with a predetermined colour. When a certain colour is found, the saturation value is finally compared with a third reference value by means of which it is determined whether the colour found is light or dark.

When the colour is determined for all pixels, the colour which is the most detected one, is chosen as main colour for the observed wire. If a plurality of pixels higher than a predetermined plurality have a common second colour, it is assumed that there is a colour code with a second colour provided in rings.

The length of wire along which the pixels of which the colour is determined, are regularly distributed, is chosen at least equal to the repetition length of the rings of the second colour. The mutual distance between the pixels is chosen in such a manner that there are always at least three pixels in a ring of the second colour.

Another application of the method according to the invention is verifying the position of colour coded electrical or electronical components on a printed circuit board. When the components are placed on a printed circuit board in a usual manner, a colour picture is made of the printed circuit board by means of a colour camera and this picture is stored in the memory. Further, the correct position of each component and the corresponding colour code is stored in the memory.

For each component some pixels are chosen at the corresponding position and the S-, H- and B-values of these pixels are determined in the above-described manner and by means of these values the respective colour. The thus detected colour is compared with the colour stored in the memory for this position. If there is no correspondence, an alarm signal is given and the corresponding position on the printed circuit board is shown on a display.

From the foregoing it will be clear that an apparatus for applying the method according to the invention comprises a colour camera for producing a colour picture or colour image of the object of which the colour has to be determined. The colour camera is connected to a processing unit or computer which is programmed in accordance with the described flow diagram for determining the colour of the object by means of one or a plurality of pixels in the recorded colour picture. To this end the apparatus comprises a memory in which the processing unit stores the picture information of the colour camera and a memory in which the required reference values for the S-, H- and B-values are stored. Of course, a usual human interface, for example a keyboard and a display, and an output device, for example for controlling the wiring apparatus, are provided.

The invention is not restricted to the above-described embodiments which can be varied in a number of ways within the scope of the invention.

What is claimed is:

1. Method for determining a colour or colour code of an object, comprising the steps of illuminating the object at a constant level, making a colour picture of the object and determining the colour of the object by means of colour information in the colour picture, characterized by the steps of determining the saturation (S), hue (h) and brightness (B) values of a plurality of pixels of the colour picture of the object distributed over the surface of the object, wherein each pixel of the plurality of pixels has an S-value, an H-value and a B-value, said steps of determining the colour of the object comprising the steps of first comparing the B-value of each pixel with a first reference value determining whether the pixel is black or not, and, if the pixel is not black, then comparing the S-value of the pixel with a second reference value determining whether the pixel is colourless or not, and, if the pixel is not colourless, then comparing the H-value of the pixel with a plurality of successive reference value ranges, each of said reference value ranges corresponding with a predetermined colour for determining the colour of the pixel.

2. Method according to claim 1, characterized in that in case of a colourless pixel grayness of the colourless pixel including, whether the colourless pixel has a white colour, is determined by comparison of the B-value of the colourless pixel with a plurality of reference ranges.

3. Method according to claim 1, characterized in that in case of a coloured pixel the S-value of the coloured pixel is compared with a third reference value determining whether the colour of the coloured pixel is light or dark.

4. Method according to claim 1, wherein the object has a main colour and may have or not have a second colour in rings with a predetermined pitch, characterized in that after determining the colour of all pixels, the colour found for most pixels is determined as the main colour of the object, wherein if more than a predetermined number of pixels of the plurality of pixels is found with the second colour, a colour code with main colour and second colour is determined.

5. Application of the method of claim 1 for determining the colour code of a plurality of electrical conductors, each conductor having a differently coloured insulating jacket, wherein a colour picture is made of each separate conductor.

6. Application of the method according to claim 1, for verifying locations of electrical components on a printed circuit board, wherein locations and corresponding colours of components of the printed circuit board to be verified are stored in a memory and wherein the colour determined for each component on the printed circuit part is compared with the colour stored for the corresponding location and wherein an alarm signal is provided in case of non-correspondence.

7. A method according to claim 1, wherein the step of making a colour picture is performed by a colour camera.

8. Apparatus for determining a colour of an object, comprising means (23) for illuminating the object at a constant level, a colour camera (22) for making a colour picture of the object, a memory (24) for storing the colour picture made, input and display means (25, 27), and a processing unit (21) for determining the colour from colour information in the colour picture, characterized by means (21) for determining for each pixel from a plurality of pixels of the colour picture of the object a saturation value, a hue value and a brightness value, a memory for storing reference values for each of the saturation, hue and brightness values, and means (21) for successively comparing the brightness value, saturation value and hue value of each pixel of the plurality of pixels with the corresponding stored reference values to determine the colour of the object.

* * * * *